(No Model.)
A. H. CELL & E. G. PASTER.
MEASURING VESSEL.
2 Sheets—Sheet 1.
No. 502,347.
Patented Aug. 1, 1893.
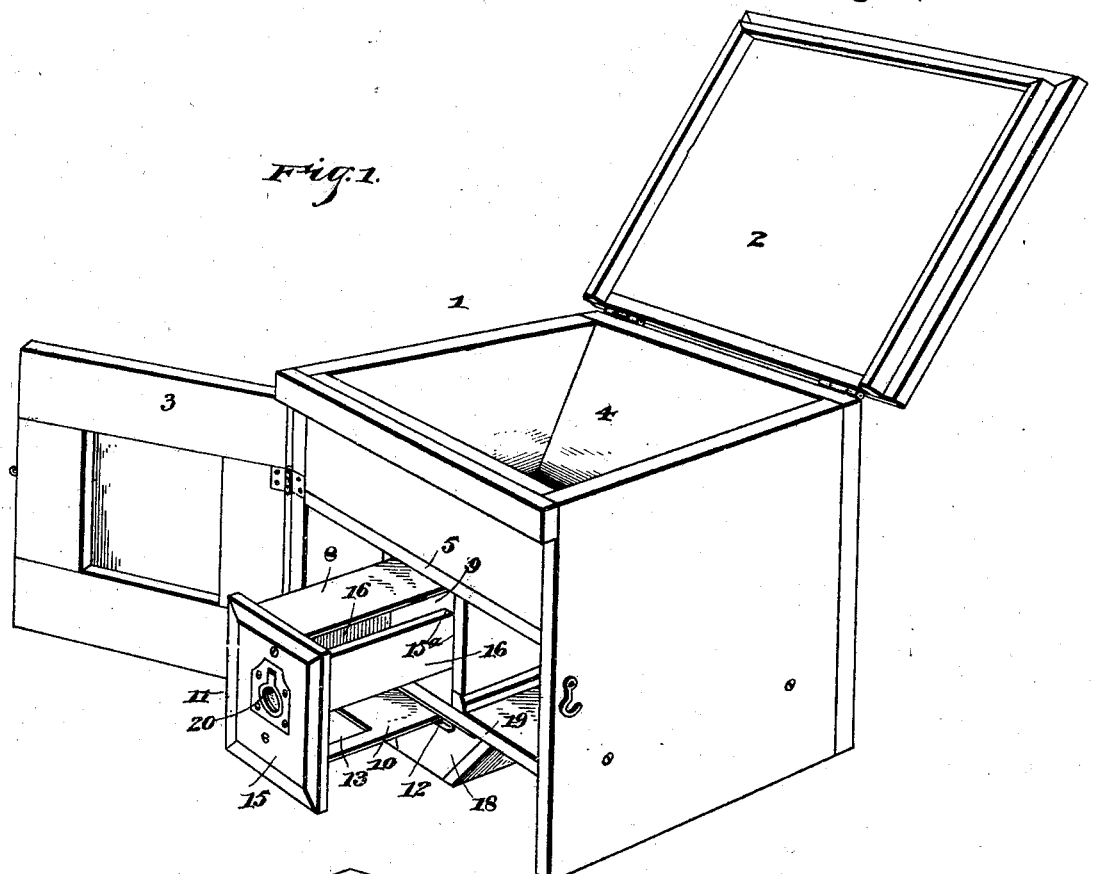
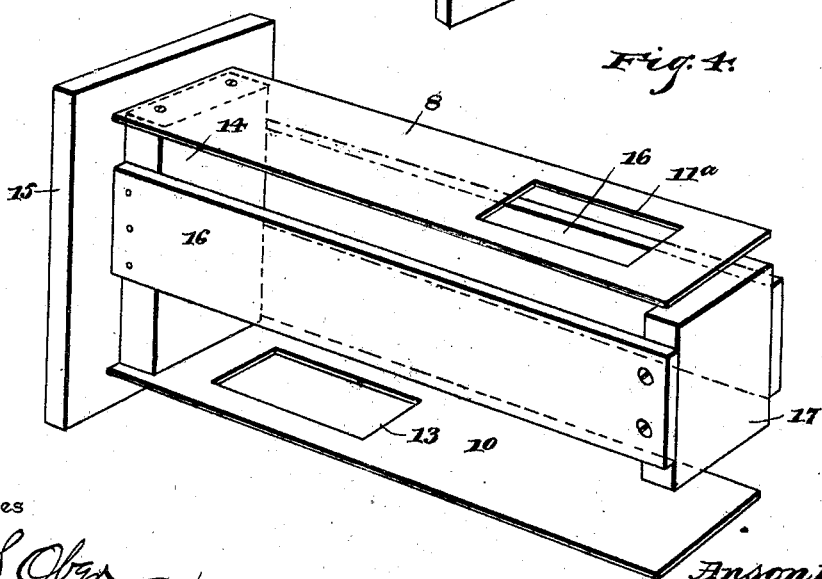

(No Model.)  2 Sheets—Sheet 2.

A. H. CELL & E. G. PASTER.
MEASURING VESSEL.

No. 502,347.  Patented Aug. 1, 1893.

Witnesses

Inventors,
Anson H. Cell,
Ellsworth G. Paster,
By their Attorneys,
C. A. Snow & Co.

UNITED STATES PATENT OFFICE.

ANSON H. CELL AND ELLSWORTH G. PASTER, OF COLORADO SPRINGS, COLORADO.

MEASURING-VESSEL.

SPECIFICATION forming part of Letters Patent No. 502,347, dated August 1, 1893.

Application filed March 9, 1893. Serial No. 465,273. (No model.)

*To all whom it may concern:*

Be it known that we, ANSON H. CELL and ELLSWORTH G. PASTER, citizens of the United States, residing at Colorado Springs, in the county of El Paso and State of Colorado, have invented a new and useful Automatic Measuring-Case, of which the following is a specification.

The invention relates to improvements in automatic measuring cases.

The object of the present invention is to provide a simple and inexpensive measuring case capable of readily and rapidly measuring given weights of substances, such as sugars, coffees, spice, cereal, and the like with great accuracy.

The invention consists in the construction and novel combination and arrangement of parts hereinafter fully described, illustrated in the accompanying drawings, and pointed out in the claims hereto appended.

Figure 2:
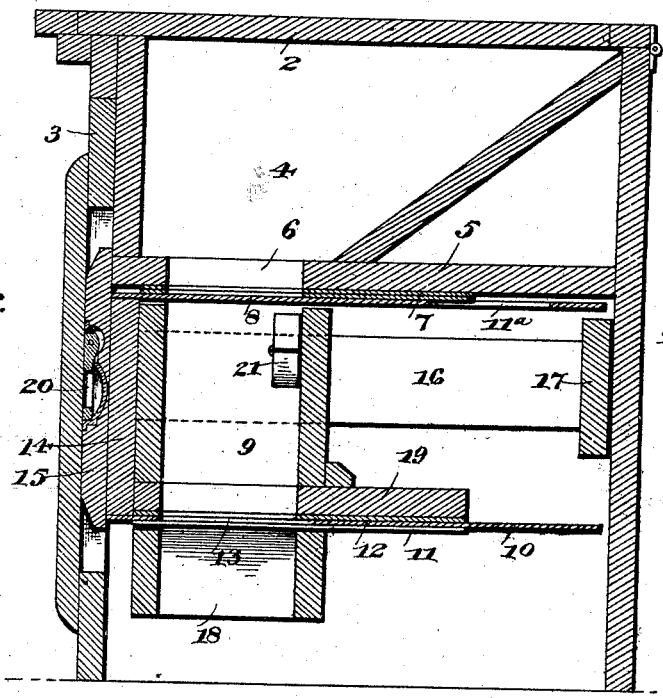
Figure 3:
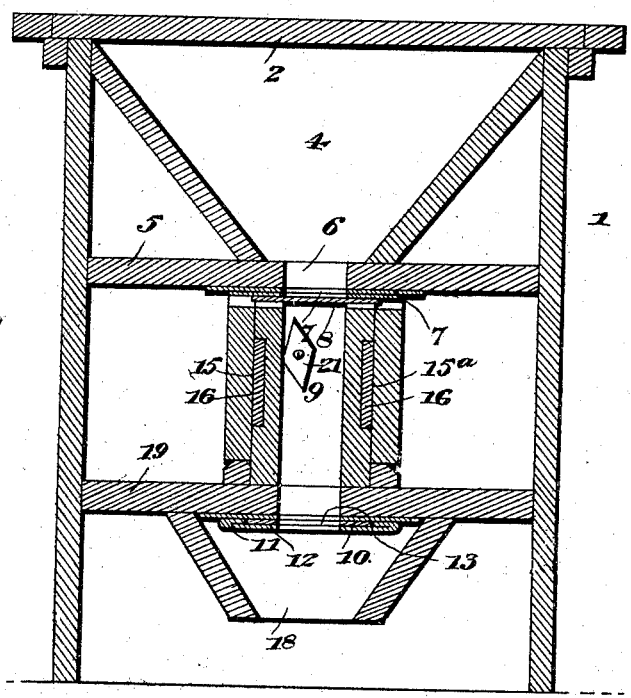

In the drawings—Figure 1 is a perspective view of a measuring case constructed in accordance with this invention, the door being open, the cover thrown back and the measure drawn out. Fig. 2 is a vertical sectional view. Fig. 3 is a similar view taken at right angles to Fig. 2. Fig. 4 is a detail perspective view of the slide and the guiding frame.

Like numerals of reference indicate corresponding parts in all the figures of the drawings.

1 designates a rectangular casing having a hinged cover 2 and door 3, and provided at the top with a bin or hopper 4, which has inwardly inclined sides, and which is arranged above a horizontal partition 5. The horizontal partition 5 is provided with a discharge opening 6, at the sides of which the lower ends of the inclined sides of the bin terminate, and the said horizontal partition 5 has secured to its lower face a sheet metal way 7, which is adapted to receive and support an upper slide 8 of a measure.

The measure consists of a measuring chamber 9 having open top and bottom and arranged below the discharge opening of the bin, and the said upper slide 8, a lower slide 10 and a guiding frame 11. The upper slide is arranged in the ways 7 and is provided with an opening $11^a$ at its inner end, and the lower slide 10 is arranged in ways 12, and is provided with an opening 13 at its outer end. The openings are rectangular and are adapted to register alternately with the discharge opening of the bin to cause the measuring chamber to fill and empty alternately with the sliding of the upper and lower slides. The ways 7 and 12 are constructed of sheet metal and are provided with securing flanges and have rectangular openings registering with the opening of the bin and the bottom of the measuring chamber. The outer ends of the slides are secured to a block 14 of the front 15 of the guiding frame; and the measuring chamber is provided in its side walls with parallel horizontal openings $15^a$, which receive guide bars 16. The guide bars have their rear ends connected by a cross-piece 17, which forms a stop to prevent the guide-bars from withdrawn from the ways $15^a$ and to limit the outward movement of the slides, in order to cause the rectangular opening of the upper one to register with the discharge opening of the bin. A tapering spout 18 is arranged beneath the measuring chamber and it is secured to a partition 19, which supports the measuring chamber.

The capacity of the measuring chamber is designed to be equal to a given number of ounces of a substance, and the casing may be provided with a series of measuring devices of different capacities, in order to enable the desired quantity to be measured; and we desire it to be understood that changes in the form, proportion and the minor details of construction may be resorted to without departing from the principle or sacrificing any of the advantages of this invention.

The guiding frame for the slide is provided with a handle 20 to enable the slides to be readily moved; and the tapering spout enables the contents of the measuring chamber to be readily discharged into a bag without any waste. The measuring chamber is provided with a diamond-shaped block 21 adapted to compensate for climatic changes in the substances.

What we claim is—

1. The combination of a casing provided with a bin having a discharge opening, a measuring chamber arranged below the bin and having its top and bottom open, a spout located beneath the measuring chamber, and slides rigidly connected with each other and simultaneously operated in the same direction and arranged above and below the measuring chamber, and provided respectively with openings at their inner and outer ends adapted to register alternately with the discharge opening of the bin and the bottom of the measuring chamber, substantially as and for the purpose described.

2. The combination of a casing provided at its top with a bin having a discharge opening, a measuring chamber arranged beneath the bin and having its top and bottom open and provided at its side walls with horizontal ways, a guiding frame provided with parallel guide bars arranged in said ways, and the upper and lower slides having at their inner and outer ends discharge openings and secured to and carried by the guiding frame, substantially as described.

3. The combination of a casing provided at its top with a bin having a discharge opening, a measuring chamber having its top and bottom open and provided at its side walls with openings, a guiding frame provided with guide bars arranged in the openings and having a cross-piece connecting the inner ends of the guide bars and forming a stop, and the slides secured to and carried by the guide frame and provided with openings arranged respectively at their outer and inner ends, substantially as described.

4. The combination of a casing provided at its top with a bin having discharge openings, a measuring chamber located beneath the bin and having an open top and bottom and provided in its side walls with openings, the ways arranged beneath the bin and the measuring chamber and constructed of sheet metal and provided with openings and having securing flanges, a guide frame provided with guide bars arranged in the openings of the side walls of the measuring chamber and provided at their rear ends with a stop cross-piece, the upper and lower slides secured to and carried by the guide frames and arranged in said ways and provided at their inner and outer ends with openings, and a spout arranged beneath the measuring chamber, substantially as described.

In testimony that we claim the foregoing as our own we have hereto affixed our signatures in the presence of two witnesses.

ANSON H. CELL.
   ELLSWORTH G. PASTER.

Witnesses:
 M. B. IRVINE,
 REMIC B. TAYLOR.